United States Patent [19]
Hermstein et al.

[11] 3,943,433
[45] Mar. 9, 1976

[54] MEASURING TRANSFORMER ARRANGEMENT FOR A HIGH-VOLTAGE INSTALLATION CARRYING SEVERAL CONDUCTORS

[75] Inventors: Wolfgang Hermstein, Nurnberg; Heinz Schiemann, Berlin, both of Germany

[73] Assignee: Siemens Aktiengesellschaft, Munich, Germany

[22] Filed: May 17, 1974

[21] Appl. No.: 471,018

[30] Foreign Application Priority Data
May 17, 1973  Germany............................ 2325451

[52] U.S. Cl........ 323/44 R; 174/99 R; 174/DIG. 10; 307/147; 323/93; 336/175
[51] Int. Cl.²..................... H01F 27/06; H01B 9/06
[58] Field of Search .... 307/147, 149; 323/93, 44 R, 323/60, 61; 174/28, 27, 99 R, 99 B, DIG. 10; 336/175

[56] References Cited
UNITED STATES PATENTS

| | | | |
|---|---|---|---|
| 1,873,977 | 8/1932 | Naef | 174/DIG. 10 |
| 3,701,944 | 10/1972 | Amalric | 174/11 BH |
| 3,730,968 | 5/1973 | Szente-Varga | 174/27 |
| 3,767,837 | 10/1973 | Graybill | 174/27 |

*Primary Examiner*—Gerald Goldberg
*Attorney, Agent, or Firm*—Kenyon & Kenyon Reilly Carr & Chapin

[57] ABSTRACT

A measuring transformer arrangement is provided for a fluid-insulated high-voltage installation with metal encapsulation carrying several conductors. The measuring transformer arrangement includes at least one conducting or semiconducting tube surrounding each conductor whereat at least one current transformer core with a system of secondary windings mounted on it is attached on the outside of the tube. The tubes are connected with each other and are attached to the metal encapsulation.

66 Claims, 5 Drawing Figures

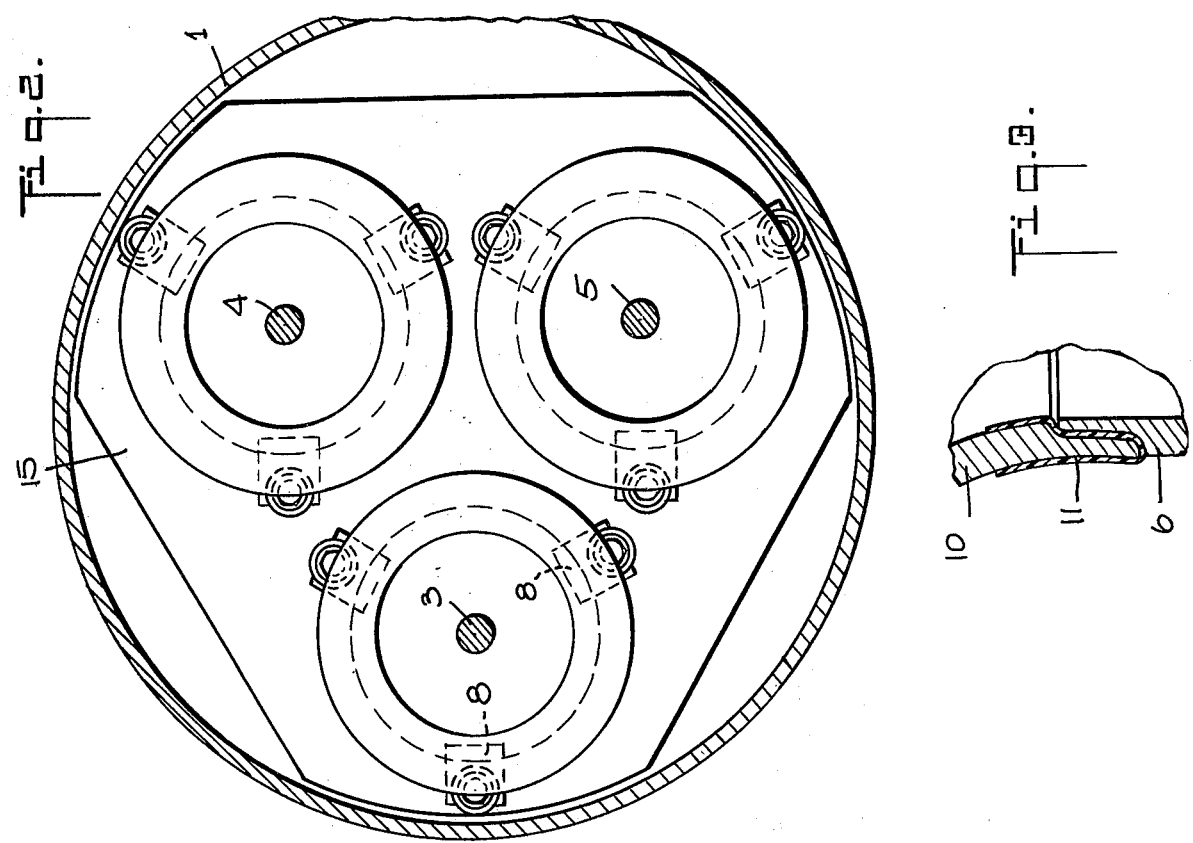
Fig.2.
Fig.3.
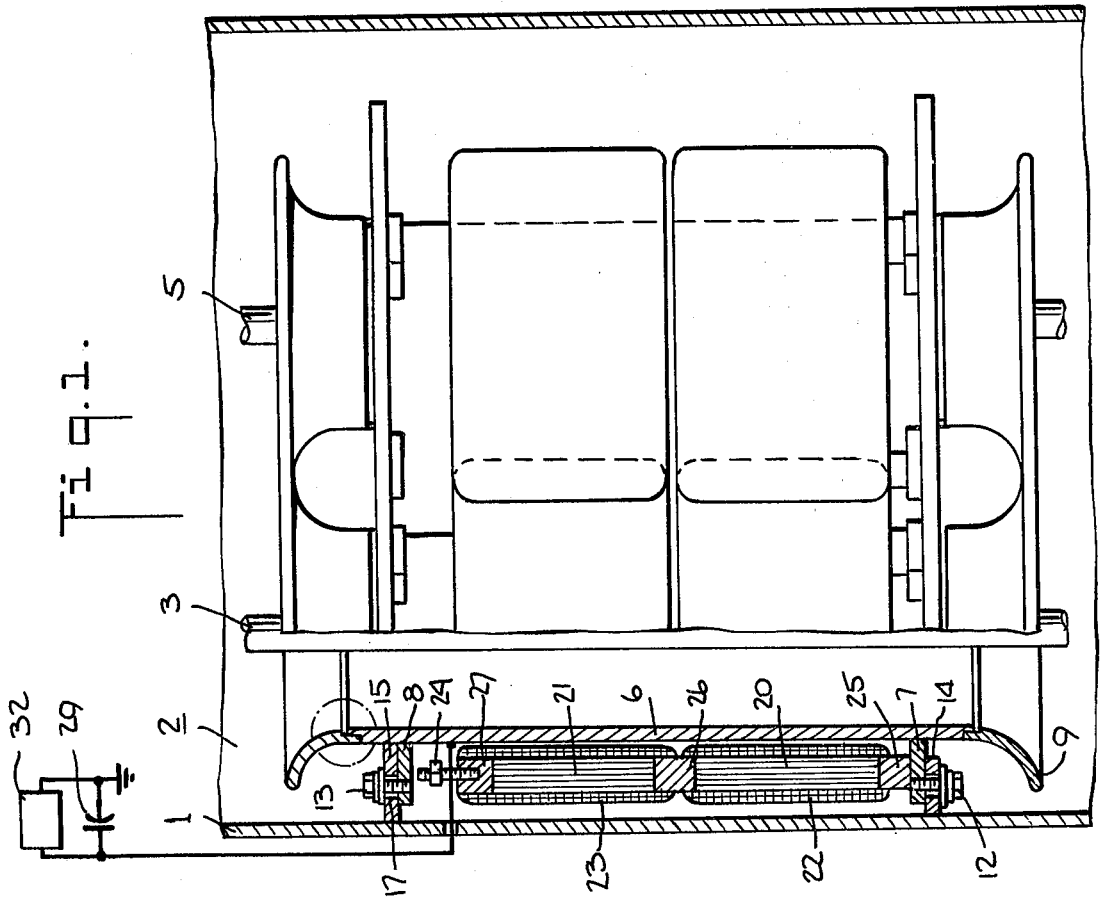
Fig.1.

MEASURING TRANSFORMER ARRANGEMENT FOR A HIGH-VOLTAGE INSTALLATION CARRYING SEVERAL CONDUCTORS

BACKGROUND OF THE INVENTION

The invention concerns a measuring transformer for a gas-insulated or liquid-insulated high-voltage switching installation with metal encapsulation, carrying several conductors.

From Deutsche Offenlegungsschrift 2,125,297 which corresponds to U.S. Pat. No. 3,763,378, a measuring transformer is known with which a current and voltage measurement in a single-phase high-voltage switching installation can be performed. Within the metal encapsulation of the high-voltage switching installation, this measuring transformer includes an insulator which carries a conducting layer on its inside surface facing the high-voltage conductor. The insulator contains a current transformer core with a system of secondary windings mounted on it. In this measuring transformer, the conducting layer forms a surface-type electrode which, in cooperation with the high-voltage conductor surrounded by it, forms the high-potential capacitor of a capacitive voltage divider. The low-potential capacitor, followed by an amplifier, is located outside the metal encapsulation. The known measuring transformer is suited for the measurement of current and voltage in single-phase high-voltage switching installations and cannot be used in high-voltage switching installations carrying several conductors.

SUMMARY OF THE INVENTION

It is therefore an object of the invention to provide a measuring transformer arrangement for making current measurement in high-voltage installations carrying several conductors. It is another object of the invention to provide such a measuring transformer arrangement for also making voltage measurements in a high voltage installation equipped with several conductors.

According to the measuring transformer arrangement of the invention, each conductor is surrounded by a tube which is conducting or semiconducting at least on its surface facing the conductor. At least one current transformer core with a system of secondary windings mounted thereon is located on the outside of each tube, and the tubes are connected with each other and are fastened at the metal encapsulation.

A single-conductor transformer for use in a fluid-insulated metal-clad, high-voltage installation is disclosed in the patent application of Heinz Schiemann entitled: Single-Conductor Transformer for High-Voltage Installations, Ser. No. 470,903, filed on May 17, 1974.

The measuring transformer arrangement according to the invention affords the primary advantage that it is of simple configuration and can therefore be installed easily. The measuring transformer arrangement is furthermore of a construction that makes it possible to accommodate the same in the metal encapsulation of the installation without having to enlarge the encapsulation or to provide extensions. The space required for the high-voltage installation is therefore not increased by the measuring transformer arrangement according to the invention.

The measuring transformer arrangement according to the invention has the further advantage that the individual current transformer cores with the systems of secondary windings mounted on them are not embedded in cast resin, so that pressure due to shrinkage cannot affect the current transformers detrimentally as to their transformation accuracy. With the measuring transformer arrangement according to the invention it is furthermore possible to make a turn adjustment still during the installation in the metal encapsulation; the secondary winding systems are accessible during the installation due to the absence of an encapsulation made of cast resin or the like.

In the measuring transformer arrangement according to the invention, the tubes may be configured in different ways. It is considered advantageous if the tubes are plastic tubes which have semiconducting or conducting coatings as control electrodes at least on the surface facing the corresponding conductor. If plastic tubes are used, the current transformer cores with the secondary winding system can be attached by cementing. The use of plastic tubes facilitates, furthermore, the manufacture of a combined current and voltage transformer.

It may also be advantageous to make the tubes of metal. This applies particularly for the case that a multi-phase current transformer is to be created.

In the measuring transformer arrangement according to the invention, the tubes may be held in the metal encapsulation by a different number of support discs. If the tubes are relatively short because, for instance, only a single current transformer core with secondary windings is to be attached on them, it may be sufficient to arrange a single support disc about in the middle of the tubes. The relatively short tubes can be held at the support disc by means of fastening attachments.

It is also considered advantageous if the tubes, with at least one support disc, form a cast structure, as this is advantageous from a design and manufacturing point of view.

If the tubes are relatively long, it is advantageous if each tube has fastening attachments at both ends and the fastening attachments are connected with one support disc each at both ends of the tubes. In order to enable the tubes to expand freely in the direction of the longitudinal axis of the metal encapsulation in the event of temperature changes, only a single support disc is preferably connected rigidly with the metal encapsulation if the arrangement is provided with two support discs; the other support disc rests against the metal encapsulation and is therefore movable in the direction of the longitudinal axis of the high-voltage installation according to the thermal expansion of the tubes. Buckling of the tubes in the event of temperature changes is thus impossible. Through the use of the support discs the further advantage is obtained that it is easy to center the individual metallic tubes in relation to the conductors of the high-voltage switching installation.

The iron cores with the systems of secondary windings mounted thereon can be attached at the individual tubes in different ways. It is, for instance, considered advantageous if for each tube, at least one mounting element is arranged on the iron core by means of which the iron core with the secondary winding system mounted thereon is fastened to the tube. A mounting element of metal is advantageously used because it can be attached at the corresponding tube made of metal by welding.

Another advantageous possibility of attaching the iron cores at the tubes is seen in clamping the iron core with the secondary winding system mounted thereon between the fastening attachments of the corresponding tube by means of a clamping device. The fastening attachments are thereby utilized twice, that is, once for mounting the individual tubes at the support discs and again, for mounting the iron cores at the tubes. The clamping device may advantageously consist of pressure screws.

If it is intended to only measure the currents in the conductors of the high-voltage installation by means of the measuring transformer arrangement according to the invention, then each tube is grounded. Each tube consists advantageously of a tube portion with a rounded end-face and of a further tube portion with a further rounded end-face which is joined to the first tube portion. The two tube portions are metallically connected with each other and form an equipotential surface, this being technically advantageous for insulation reasons. The high-voltage is brought down between this equipotential surface and the respective high-voltage conductor through the use of the insulating medium of the high-voltage installation. Such a tube, consisting of two parts, is of course, necessary only if a ring band-core is to be used, so that this core can be placed on the tube. If, on the other hand, cut band cores are to be used, then a tube made of one piece, which is bent outward at both its ends in order to obtain an equipotential surface, can also be used if this appears more advantageous for manufacturing reasons.

A ring band-core is a magnetic circuit wound from high permeability shut metal so as to have an annular configuration. A cut band-core is a ring band-core which is cut to simplify production and assembly of the coil.

For manufacturing reasons it may also be advantageous if each grounded tube consists of a center section and two outer parts with rounded end faces which are connected with the center section.

With this configuration of the tubes, the center section always carries fastening attachments and the outer parts always have fastening lugs. Fastening lugs at the outer part are braced against the fastening attachments and against the one supporting disc at the one end of the corresponding tube, and the fastening lugs at the other outer part against the fastening attachments of the other end of the tube and against the further support disc. This construction of the tubes has the advantage that the fastening attachments can be used additionally for forming a tube which has rounded end faces and consists of several parts.

The tubes can be grounded in different ways, for example, by means of a wire which is connected on the one side metallically with the tubes and on the other side metallically with the metal encapsulation of the high-voltage installation. However, it is considered as particularly advantageous if one support disc consists of metal, which is connected on the one side metallically with the tubes and on the other side metallically with the metal encapsulation due to its attachment at the latter.

However, the measuring transformer arrangement according to the invention not only allows, as explained above, to measure currents in the conductors of a high-voltage installation, but it can also be used as a combined current and voltage transformer for a multiphase high-voltage installation. To this end, the tubes are always arranged insulated from the metal encapsulation and, together with the respective conductors of the high-voltage installation surrounded by them, form a high-potential capacitor of a capacitive voltage divider, always with a low-potential capacitor connected to the high-potential capacitor; at both ends of the tubes, tube sections forming guard ring electrodes are preferably arranged, insulated from the tubes. In this construction of the measuring transformer arrangement according to the invention, the tubes form not only the support structures for the iron cores with systems of secondary windings mounted on them, but they are utilized in addition as surface-type electrodes for forming high-potential capacitors.

In a measuring transformer arrangement configured as a combined current and voltage transformer in accordance with the invention, the tube portions can be attached to the tubes in different ways. It is considered advantageous if the tube portions are each provided with fastening lugs; a support disc of insulating material is arranged in each case between the fastening lugs at the one tube portion and the fastening attachments at the one end of the tubes, and a further support disc of insulating material is attached between the fastening lugs at the other tube portion and the fastening attachments of the other end of the tubes. The screws clamping fastening lugs to the fastening attachments are always insulated against the fastening lugs or fastening attachments by annular spacers. In this connection, the fastening lugs can advantageously be formed by flanges bent out of the tube portions.

For reasons of construction, it is considered as particularly advantageous if the tube portions forming the guard ring electrodes are cemented to the tubes; here, the tube portions and the tubes each have layers of insulating material on the surfaces which are to be cemented together. These layers can be applied, for instance, by coating with powder or spin-sintering.

Although the invention is illustrated and described herein as a measuring transformer arrangement for a high-voltage installation carrying several conductors, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 1 is a schematic diagram, partially in section, illustrating a measuring transformer arrangement according to the invention arranged in the metal encapsulation of a high-voltage installation having a plurality of conductors.

FIG. 2 is a plan view of the measuring transformer arrangement of FIG. 1.

FIG. 3 illustrates a structural detail of the portion of the measuring transformer arrangement in FIG. 1 within the broken-line circle.

DESCRIPTION OF THE PREFERRED EMBODIMENTS OF THE INVENTION

Figure 4:
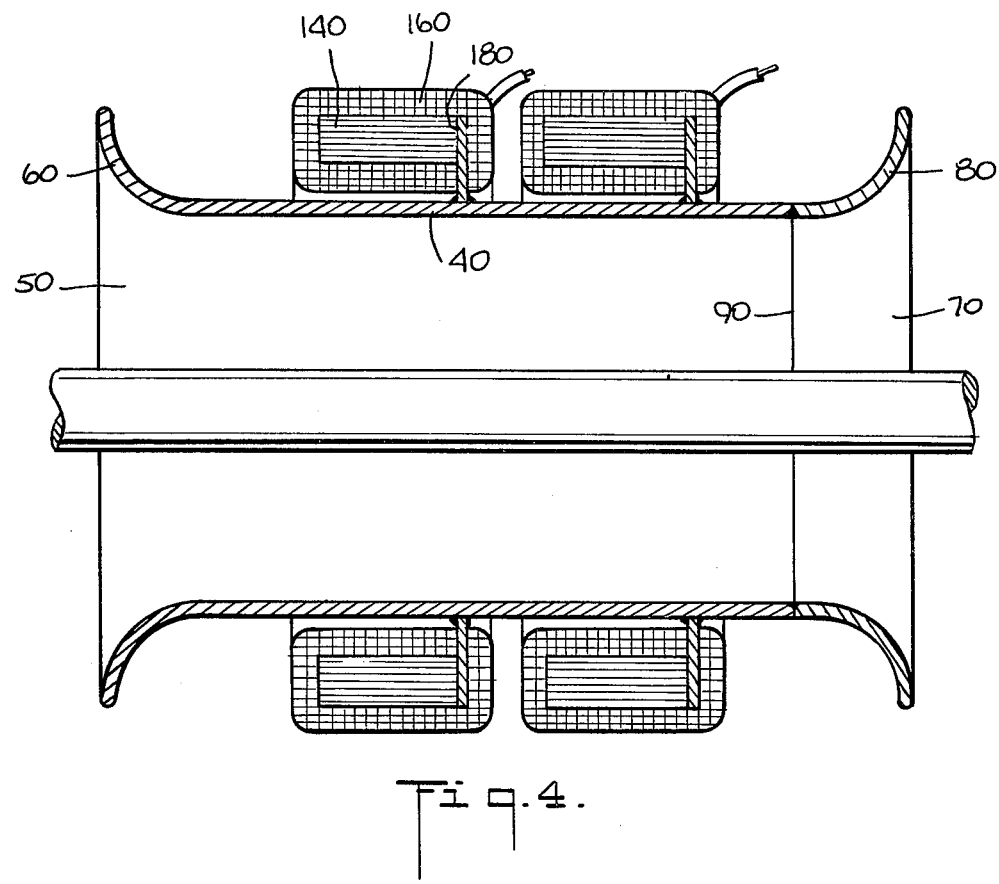
FIG. 4 illustrates how the transformer core units can be mounted on corresponding tube members according to a subsidiary embodiment of the invention as well as showing how the tube member can be made up of two parts joined together.

Referring to FIGS. 1 to 3 of the drawing, three conductors 3, 4 and 5 are run in the metal encapsulation 1 of a high-voltage switching installation 2. Each of the conductors 3 to 5 is surrounded by a corresponding tube 6 in the form of a metal cylinder. The tubes 6 are provided at one end with fastening brackets 7 and at the other end with further fastening brackets 8. To the ends of each tube 6 are cemented tube portions 9 and 10, respectively. The tube portions 9 and 10 are bent outward and form protective ring-electrodes because they carry on their respective surfaces cemented to the tube 6, a layer of insulation 11, as may be seen particularly in FIG. 3 and are therefore arranged insulated from the tubes 6.

The fastening attachments 7 and 8 of the tubes 6 are connected to support discs 14 and 15 by means of screws 12 and 13, respectively. One of the support discs 14 and 15 is firmly connected with the metal encapsulation 1; while the other disc rests against the metal encapsulation 1 as a support element. The discs 14 and 15 are made of insulating material to avoid a metallic connection between the tubes 6 and the grounded metal encapsulation 1. In order to be able to center the individual tubes 6 relative to the corresponding conductors 3 to 5 disposed therein, the support discs 14 and 15 are provided with holes 17 having a diameter larger than the shank of the screw 13. It is thereby possible to shift the individual tubes 6 in the radial direction into the centered position before tightening the screws 12 and 13.

As may be seen particularly from FIGS. 1 and 2, each tube 6 is provided with attachment sets which include fastening shoulders 7 and 8. Each attachment set has three fastening shoulders 7, 8 which are uniformly spaced about the circumference of the tube 6.

Within the constricted region conjointly defined by the tube 6 and the two tube portions 9 and 10 are disposed an iron core 20 and a further iron core 21, each with a secondary winding system 22 and 23, respectively. The cores 20 and 21 are held in place in the constricted area by means of a clamping device 24 which can, for example, be in the form of pressure screws. The iron cores are clamped between the respective fastening shoulders 7 and 8 by means of the clamping device with pressure pieces 25, 26 and 27 interposed. At the output terminals, not shown, of the secondary windings, a measurement quantity can then be taken off, which corresponds to the current in the respective conductors 3 to 5 of the high-voltage switching installation 2.

Referring to FIG. 1, the tube 6 is at the same time used also for measuring the voltage; this tube, together with the respective conductors 3 to 5 disposed in it always forms a high-potential capacitor of a capacitive voltage divider whose low-potential capacitor 29 may be arranged outside the metal encapsulation 1. As a rule, an amplifier 32 is connected to the low-potential capacitor.

According to an alternate embodiment, it is also possible to configure the low-potential capacitor as a circularly wound capacitor and to arrange it also in the area which is formed by the tube and the tube portions. It is then only necessary to see to it that the tube is made correspondingly long. It is an advantage of this solution that no additional space is needed outside the metal encapsulation for accommodating the low-potential capacitors. A further advantage is that the low-potential capacitor is subjected to the same temperature changes as the high-potential capacitor, which has a favorable effect on the constancy of the division ratio of the capacitive voltage divider.

The measuring transformer according to the invention is suitable for a gas-insulated or liquid-insulated high-voltage installation carrying several conductors and can be manufactured simply and affords favorable measurement properties.

FIG. 4 illustrates how a transformer core unit can be mounted on a tubular member. The transformer core unit includes an iron core 140 and a secondary winding system 160 mounted thereon. Holding means in the form of a holding element 180 is provided for securing the transformer core unit to the tube member 40. The tube member 40 and the holding element 180 can be made of metal. The holding element 180 is shown welded to the outer surface of the tube member 40.

The tube member 40 is made up of a first tubular part 50 having a rounded end-face 60 and a second tubular part 70 having a rounded end-face 80. The second tubular part 70 is connected to the first tubular part 50 at the interface 90.

Figure 5:
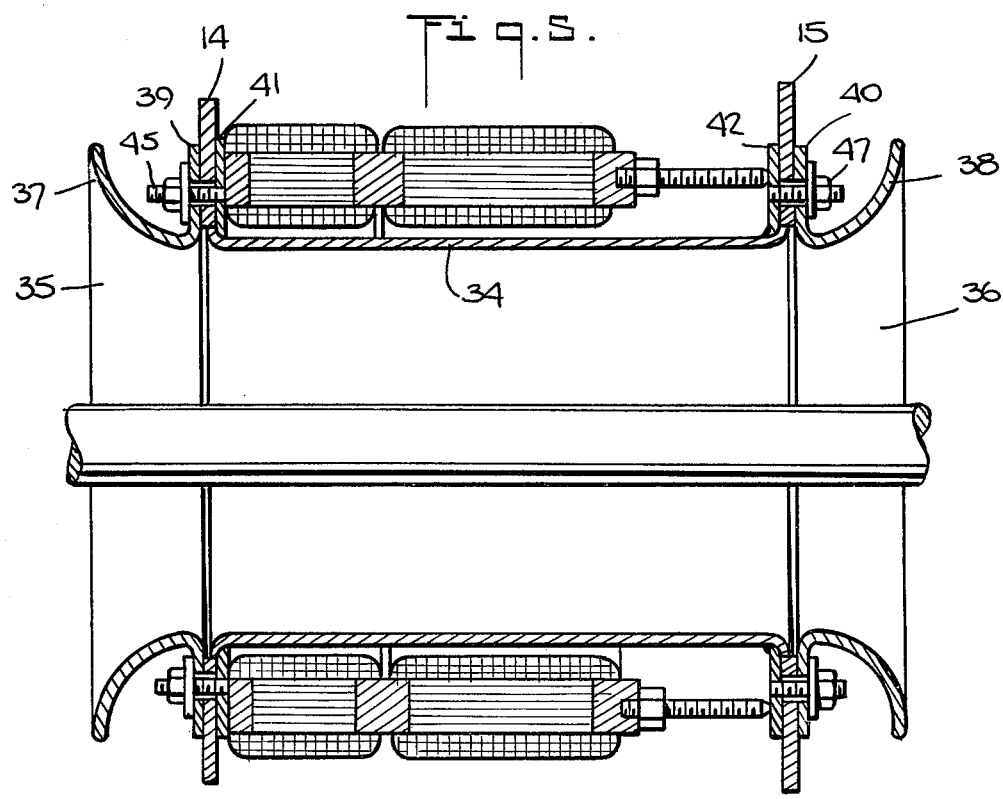
FIG. 5 illustrates details of how the transformer core units can be mounted on the tube members according to another subsidiary embodiment of the invention. This view also shows how the tube member can be attached to the insulating discs according to a subsidiary embodiment.

FIG. 5 illustrates another configuration of the tube member wherein the tube member includes a central tube part 34 and two outer parts 35 and 36 connected to respective ends of the center tube part 34. Each of the outer parts has a rounded end-face 37, 38 facing away from the center tube part 34. One of the outer parts 35 adjoins the center tube part 34 at one end thereof and the other outer part 36 adjoins the center tube part 34 at the other end thereof. The mounting means for mutually connecting the tube members and for mounting the tube members in the metal encapsulation can include two supporting discs 14 and 15.

Two attachment sets corresponding to each of the tube members are provided for attaching the same to the discs 14 and 15, respectively. The attachment sets are disposed at the respective locations where the outer parts 35 and 36 adjoin the center tube part 34. One of the attachment sets includes a fastening shoulder 41 extending from the center tube part 34 at one end thereof and a fastening tab 39 extending from the outer part 35. The fastening shoulder 41 and the fastening tab 39 are tightly connected to supporting disc 14. The other one of the attachment sets includes a fastening shoulder 42 extending from the center tube part 34 at the other end thereof and a fastening tab 40 extending from the other outer part 36. Fastening shoulder 42 and fastening tab 40 are both tightly connected to the supporting disc 15.

Insulating clamping means 45 clamps the fastening shoulder 41 with the fastening tab 39 so as to insulate the shoulder 41 from the tab 39. Insulating clamping means 47 is provided in a like manner for fastening shoulder 42 and fastening tab 40. FIG. 5 also shows in greater detail the clamping device 24.

What is claimed is:

1. A measuring transformer arrangement for a metal-encapsulated, fluid-insulated, high-voltage installation equipped with a plurality of conductors comprising: a plurality of tube members disposed in surrounding relation to corresponding ones of the conductors, each of said tube members having an inner surface portion facing the conductor disposed therein, said surface portion having a value of electrical conductivity selected from a conductivity value in the range extending from the value of electrical conductivity of a semiconductor to the value of electrical conductivity of metal; a plurality of transformer core units corresponding to said tube members, respectively, each of said transformer core units including an iron core, and a secondary winding system mounted on said core; mounting means for mutually connecting said tube members and for mounting said tube members on the metal encapsulation, said mounting means comprising a supporting disc mounted to the metal enclosure of the high-voltage installation, said tube members being mounted in said supporting disc; and, holding means for mounting said transformer core units to said tube members respectively.

2. The measuring transformer arrangement of claim 1, each of said tube members comprising an annular member of plastic material, said surface portion being a conductive coating carried by said annular member.

3. The measuring transformer arrangement of claim 1, each of said tube members being made of metal.

4. The measuring transformer arrangement of claim 1, said tube members and said supporting disc being a single cast body.

5. The measuring transformer arrangement of claim 1 wherein the metal encapsulation is filled with an insulating fluid which also occupies the space enclosed by said tube members whereby the insulating fluid in said space constitutes the insulating medium between said tube members and the conductors respectively.

6. The measuring transformer arrangement of claim 1 comprising cast resin disposed within each of said tube members filling the space of each of said tube members so as to constitute an insulating medium therein.

7. The measuring transformer arrangement of claim 1 comprising a plurality of insulating discs corresponding to respective ones of said tube members, each of said insulating discs being disposed between the tube member and the conductor therein for spacing and centering the tube member from the conductor.

8. The measuring transformer arrangement of claim 7, each of said insulating discs being configured so as to extend the leakage path between the conductor and the tube member whereby an increase in dielectric strength is obtained.

9. The measuring transformer arrangement of claim 1, said mounting means comprising an additional supporting disc for supporting said tube members, and two attachment sets corresponding to each one of said tube members, said attachment sets being at respective ends of said tube members for attaching said tube member to said discs respectively.

10. The measuring transformer arrangement of claim 9 wherein each of said tube members is grounded, each of said tube members comprising a first tubular part having a rounded endface, and a second tubular part having a rounded end-face and being connected to said first tubular part.

11. The measuring transformer arrangement of claim 9 wherein each of said tube members is grounded, each of said tube members comprising a center tube part, and two outer parts connected to respective ends of said center tube part, each of said outer parts having a rounded end-face facing away from said center tube part.

12. The measuring transformer arrangement of claim 11, each of said tube members comprising an annular member of plastic material, said surface portion being a conductive coating carried by said annular member.

13. The measuring transformer arrangement of claim 11, each of said tube members being made of metal.

14. The measuring transformer arrangement of claim 11 wherein the metal encapsulation is filled with an insulating fluid which also occupies the space enclosed by said tube members whereby the insulating fluid in said space constitutes the insulating medium between said tube members and the conductors respectively.

15. The measuring transformer arrangement of claim 11 comprising cast resin disposed within each of said tube members filling the space of each of said tube members so as to constitute an insulating medium therein.

16. The measuring transformer arrangement of claim 11 comprising a plurality of insulating discs corresponding to respective ones of said tube members, each of said insulating discs being disposed between the tube member and the conductor therein for spacing and centering the tube member from the conductor.

17. The measuring transformer arrangement of claim 16, each of said insulating discs being configured so as to extend the leakage path between the conductor and the tube member whereby an increase in dielectric strength is obtained.

18. The measuring transformer arrangement of claim 11 comprising holding means for mounting said transformer core units to said tube members respectively.

19. The measuring transformer arrangement of claim 18, each of the attachment sets comprising a fastening shoulder, the fastening shoulders corresponding to each of said tube members being mutually adjacent, said holding means being a clamping device for clamping said iron core of the corresponding transformer core unit between said mutually adjacent fastening shoulders.

20. The measuring transformer arrangement of claim 19, said clamping device comprising a plurality of pressure screws.

21. The measuring transformer arrangement of claim 11 wherein one of said outer parts adjoins said center tube part at one end thereof, and the other one of said outer parts adjoins said center tube part at the other end thereof; said mounting means comprising at least two supporting discs for supporting said tube members, and two attachment sets corresponding to each one of said tube members for attaching the same to said discs respectively, said attachment sets being at the respective locations where said outer parts adjoin said center tube part; one of said attachment sets including a fastening shoulder extending from said center tube part at said one end thereof, and a fastening tab extending from said one outer part, said fastening shoulder and said fastening tab both being tightly connected to one of said supporting discs; the other one of said attachment sets including a fastening shoulder extending from said center tube part at said other end thereof, and a fastening tab extending from said other one of said outer parts, said last-mentioned fastening shoulder and said last-mentioned fastening tab both being tightly connected to the other one of said supporting discs.

22. The measuring transformer arrangement of claim 21, at least one of said supporting discs being made of metal for electrically connecting said tube members with the metal enclosure of the high-voltage installation whereby said tube members are grounded.

23. The measuring transformer arrangement of claim 9, each of said tube members and the conductor corresponding thereto conjointly defining a high-voltage capacitor, said arrangement further comprising a low-voltage capacitor connected to said high-voltage capacitor to conjointly define therewith a capacitive voltage divider.

24. The measuring transformer arrangement of claim 23, each of said tube members comprising an annular member of plastic material, said surface portion being a conductive coating carried by said annular member.

25. The measuring transformer arrangement of claim 23, each of said tube members being made of metal.

26. The measuring transformer arrangement of claim 23 wherein the metal encapsulation is filled with an insulating fluid which also occupies the space enclosed by said tube members whereby the insulating fluid in said space constitutes the insulating medium between said tube members and the conductors respectively.

27. The measuring transformer arrangement of claim 23 comprising cast resin disposed within each of said tube members filling the space of each of said tube members so as to constitute an insulating medium therein.

28. The measuring transformer arrangement of claim 23 comprising a plurality of insulating discs corresponding to respective ones of said tube members, each of said insulating discs being disposed between the tube member and the conductor therein for spacing and centering the tube member from the conductor.

29. The measuring transformer arrangement of claim 28, each of said insulating discs being configured so as to extend the leakage path between the conductor and the tube member whereby an increase in dielectric strength is obtained.

30. The measuring transformer arrangement of claim 23 comprising holding means for mounting said transformer core units to said tube members respectively.

31. The measuring transformer arrangement of claim 30, each of the attachment sets comprising a fastening shoulder, the fastening shoulders corresponding to each of said tube members being mutually adjacent, said holding means being a clamping device for clamping said iron core of the corresponding transformer core unit between said mutually adjacent fastening shoulders.

32. The measuring transformer arrangement of claim 31, said clamping device comprising a plurality of pressure screws.

33. The measuring transformer arrangement of claim 23, comprising two protective ring-electrodes corresponding to each one of said tube members, each of said ring-electrodes being configured as a tubular part, said tubular parts being mounted at respective longitudinal ends of the tube member so as to be electrically insulated therefrom.

34. The measuring transformer arrangement of claim 33, said tubular parts being cemented to the tube member corresponding thereto.

35. The measuring transformer arrangement of claim 33 wherein one of said tubular parts is mounted on said tube member at one end thereof, and the other one of said tubular parts is mounted on the tube member at the other end thereof; said mounting means comprising at least two supporting discs made of insulating material for supporting said tube members, and two attachment sets corresponding to each one of said tube members for attaching the same to said discs respectively, said attachment sets being at respective locations where said tubular parts are mounted on said tube member; one of said attachment sets including a fastening shoulder extending from said tube member at said one end thereof, a fastening tab extending from said one tubular part, one of said supporting discs being between said fastening shoulder and said fastening tab, and insulating clamp means for clamping said fastening shoulder to said fastening tab so as to insulate said shoulder from said tab; and the other one of said attachment sets including a fastening shoulder extending from said tubular member at said other end thereof, a fastening tab extending from said other one of said tubular parts, the other one of said supporting discs being between said last-mentioned fastening shoulder and said last-mentioned fastening tab, and insulating clamping means for clamping said last-mentioned fastening shoulder to said lastmentioned fastening tab so as to insulate said last-mentioned shoulder from said last-mentioned tab.

36. The measuring transformer arrangement of claim 35, each of said tubular parts having a bent-over edge portion constituting the fastening tab thereof.

37. The measuring transformer arrangement of claim 35, each of said insulating clamping means comprising screw means for clamping the fastening shoulder to the fastening tab; and annular spacer means for insulating said screw means from said fastening tab.

38. The measuring transformer arrangement of claim 38, each of said insulating clamping means comprising screw means for clamping the fastening shoulder to the fastening tab; and annular spacer means for insulating said screw means from said fastening shoulder.

39. The measuring transformer arrangement of claim 1, said holding means comprising a plurality of holding elements corresponding to respective ones of said transformer core units for securing said transformer core units to said tube members respectively.

40. The measuring transformer arrangement of claim 39 wherein each of said tube members is grounded, each of said tube members comprising a first tubular part having a rounded endface, and a second tubular part having a rounded end-face and being connected to said first tubular part.

41. The measuring transformer arrangement of claim 39 wherein each of said tube members is grounded, each of said tube members comprising a center tube part, and two outer parts connected to respective ends of said center tube part, each of said outer parts having a rounded end-face facing away from said center tube part.

42. The measuring transformer arrangement of claim 31, each of said tube members comprising an annular member of plastic material, said surface portion being a conductive coating carried by said annular member.

43. The measuring transformer arrangement of claim 41, each of said tube members being made of metal.

44. The measuring transformer arrangement of claim 41, said tube members and said supporting disc being a single cast body.

45. The measuring transformer arrangement of claim 41 wherein the metal encapsulation is filled with an insulating fluid which also occupies the space enclosed by said tube members whereby the insulating fluid in said space constitutes the insulating medium between said tube members and the conductors respectively.

46. The measuring transformer arrangement of claim 41 comprising cast resin disposed within each of said tube members filling the space of each of said tube members so as to constitute an insulating medium therein.

47. The measuring transformer arrangement of claim 41 comprising a plurality of insulating discs corresponding to respective ones of said tube members, each of said insulating discs being disposed between the tube member and the conductor therein for spacing and centering the tube member from the conductor.

48. The measuring transformer arrangement of claim 47, each of said insulating discs being configured so as to extend the leakage path between the conductor and the tube member whereby an increase in dielectric strength is obtained.

49. The measuring transformer arrangement of claim 41, each of said tube members being made of metal, and each of said holding elements also being made of metal and being welded to the outer surface of the tube member.

50. The measuring transformer arrangement of claim 41 wherein one of said outer parts adjoins said center tube part at one end thereof, and the other one of said outer parts adjoins said center tube part at the other end thereof; said mounting means comprising at least two supporting discs for supporting said tube members, and two attachment sets corresponding to each one of said tube members for attaching the same to said discs respectively, said attachment set being at the respective locations where said outer parts adjoin said center tube part; one of said attachment sets including a fastening shoulder extending from said center tube part at said one end thereof, and a fastening tab extending from said one outer part, said fastening shoulder and said fastening tab both being tightly connected to one of said supporting discs; the other one of said attachment sets including a fastening shoulder extending from said center tube part at said other end thereof, and a fastening tab extending from said other one of said outer parts, said last-mentioned fastening shoulder and said last-mentioned fastening tab both being tightly connected to the other one of said supporting discs.

51. The measuring transformer arrangement of claim 50, at least one of said supporting discs being made of metal for electrically connecting said tube members with the metal enclosure of the high-voltage installation whereby said tube members are grounded.

52. The measuring transformer arrangement of claim 39, each of said tube members and the conductor corresponding thereto conjointly defining a high-voltage capacitor, said arrangement further comprising a low-voltage capacitor connected to said high-voltage capacitor to conjointly define therewith a capacitive voltage divider.

53. The measuring transformer arrangement of claim 52, each of said tube members comprising an annular member of plastic material, said surface portion being a conductive coating carried by said annular member.

54. The measuring transformer arrangement of claim 52, each of said tube members being made of metal.

55. The measuring transformer arrangement of claim 52, said tube members and said supporting disc being a single cast body.

56. The measuring transformer arrangement of claim 52 wherein the metal encapsulation is filled with an insulating fluid which also occupies the space enclosed by said tube members whereby the insulating fluid in said space constitutes the insulating medium between said tube members and the conductors respectively.

57. The measuring transformer arrangement of claim 52 comprising cast resin disposed within each of said tube members filling the space of each of said tube members so as to constitute an insulating medium therein.

58. The measuring transformer arrangement of claim 52 comprising a plurality of insulating discs corresponding to respective ones of said tube members, each of said insulating discs being disposed between the tube member and the conductor therein for spacing and centering the tube member from the conductor.

59. The measuring transformer arrangement of claim 58, each of said insulating discs being configured so as to extend the leakage path between the conductor and the tube member whereby an increase in dielectric strength is obtained.

60. The measuring transformer arrangement of claim 52, each of said tube members being made of metal, and each of said holding elements also being made of metal and being welded to the outer surface of the tube member.

61. The measuring transformer arrangement of claim 52 comprising two protective ring-electrodes corresponding to each one of said tube members, each of said ring-electrodes being configured as a tubular part, said tubular parts being mounted at respective longitudinal ends of the tube member so as to be electrically insulated therefrom.

62. The measuring transformer arrangement of claim 61, said tubular parts being cemented to the tube member corresponding thereto.

63. The measuring transformer arrangement of claim 61 wherein one of said tubular parts is mounted on said tube member at one end thereof, and the other one of said tubular parts is mounted on the tube member at the other end thereof; said mounting means comprising at least two supporting discs made of insulating material for supporting said tube members, and two attachment sets corresponding to each one of said tube members for attaching the same to said discs respectively, said attachment sets being at respective locations where said tubular parts are mounted on said tube member; one of said attachment sets including a fastening shoulder extending from said tube member at said one end thereof, a fastening tab extending from said one tubular part, one of said supporting discs being between said fastening shoulder and said fastening tab, and insulating clamping means for clamping said fastening shoulder to said fastening tab so as to insulate said shoulder from said tab; and the other one of said attachment sets including a fastening shoulder extending from said tubular member at said other end thereof, a fastening tab extending from said other one of said tubular parts, the other one of said supporting discs being between said last-mentioned fastening shoulder and said last-mentioned fastening tab, and insulating clamping means for clamping said last-mentioned fastening shoulder to said lastmentioned fastening tab so as to insulate said last-mentioned shoulder from said last-mentioned tab.

64. The measuring transformer arrangement of claim 63, each of said insulating clamping means comprising screw means for clamping the fastening shoulder to the fastening tab; and annular spacer means for insulating said screw means from said fastening tab.

65. The measuring transformer arrangement of claim 63, each of said insulating clamping means comprising screw means for clamping the fastening shoulder to the fastening tab; and annular spacer means for insulating said screw means from said fastening shoulder.

66. The measuring transformer arrangement of claim 63, each of said tubular parts having a bent-over edge portion constituting the fastening tab thereof.

* * * * *